United States Patent [19]

Chen et al.

[11] Patent Number: 5,174,923
[45] Date of Patent: Dec. 29, 1992

[54] CYCLIC PHOSPHAZENE AND SALT ANTISTATIC COMPOSITION

[75] Inventors: Janglin Chen, Rochester; Wayne T. Ferrar, Fairport; Hans R. Grashof; Akemi S. Marshall, both of Rochester, all of N.Y.

[73] Assignee: Eastman Kodak Company, Rochester, N.Y.

[21] Appl. No.: 572,585

[22] Filed: Aug. 27, 1990

Related U.S. Application Data

[62] Division of Ser. No. 305,591, Feb. 3, 1989, Pat. No. 4,971,897.

[51] Int. Cl.$^5$ .......................... G03C 1/85; H01B 1/12; C08G 79/02
[52] U.S. Cl. .................................. 252/500; 252/518; 252/521; 558/80; 564/13
[58] Field of Search ................... 252/500, 518, 521; 558/80; 564/13

[56] References Cited

U.S. PATENT DOCUMENTS

| | | | |
|---|---|---|---|
| 3,304,270 | 2/1967 | Dickerson | 528/28 |
| 3,428,456 | 2/1969 | Ulrich et al. | 430/527 |
| 4,026,839 | 5/1977 | Dieck et al. | 521/134 |
| 4,218,556 | 8/1980 | Hergenrother et al. | 528/168 |
| 4,258,173 | 3/1981 | Schulz et al. | 528/168 |
| 4,412,066 | 10/1983 | Allcock et al. | 528/168 |
| 4,656,246 | 4/1987 | Chang et al. | 528/499 |
| 4,663,420 | 5/1987 | Chang | 528/168 |
| 4,668,762 | 5/1987 | Ogata | 528/286 |

FOREIGN PATENT DOCUMENTS

| | | |
|---|---|---|
| 0304296 | 8/1988 | European Pat. Off. |
| 51-151743 | 12/1976 | Japan |
| 60-173168 | 9/1985 | Japan |
| 61-129882 | 4/1986 | Japan |
| 62-286038 | 4/1987 | Japan |
| 1052388 | 12/1966 | United Kingdom |
| 1597698 | 9/1981 | United Kingdom |

OTHER PUBLICATIONS

Semkow et al., J. Electrochem. Soc., vol. 134, No. 3, (1987), pp. 766-767, Secondary Solid-State SPE Cells.
Corda et al., Heterocycles, vol. 24, No. 10, (1986), pp. 2821-2826 Synthesis of New Cyclophosphazenes Containing Polyoxyethylene Moieties.
Janout et al., J. of Polymer Science, vol. 25, (1987), pp. 3489-3493, The Preparation of Polyphosphazene Oligo(oxyethylene) Branches.
Shriver et al., Polymer Electrolytes Based on Polyphosphazene Backbones, Polymer Preprints, vol. 28, No. 1, (1987), p. 438.
Exharos et al., Molecular Spectroscopic Characterization of Binding Interactions in Phosphazene Stabilized Alumina Dispersions, (1987).
Exarhos et al., J. Am. Ceram. Soc., 71(9), (1988), pp. C406-C407, P NMR Studies of Aqueous Colloidal Dispersions Stabilized by Polyphosphazene Adsorption.
Tonge et al., J. Electrochem Soc., (1987), pp. 269-270 Increased Dimensional Stability in Ionically Conducting Polyphosphazenes Systems.
Higashi et al., Macromolecules, vol. 21, (1988), pp. 2299-2301 A New Class of Cation Conductors: Polyphosphazene Sulfonates.
Cowie et al., Makromol. Chem. Rapid Commun., vol. 9, (1988), pp. 387-391, Ion Conduction in Mixtures of Salts and Polyphosphazenes with Pendant 16-Crown-5 Ether Groups.
Cowie et al. The Effect of Spacer Length on the Conductivity of Poly(bis(1,4,7,10,13-Pentaoxacyclohexadecane)oxaphosphazene)-Sodium Perchlorate Mixtures, (1988).
Papke et al., Journal of Electrochemical Society, vol. 129, Aug. 1982, pp. 1694-1700.
Shriver et al., Solid State Ionics, 1981, pp. 83-88.

Primary Examiner—William R. Dixon, Jr.
Assistant Examiner—Anthony J. Green

[57] ABSTRACT

The present invention provides an antistatic composition comprising a binder, a cyclic phosphazene, and a salt that complexes with the cyclic phosphazene. The cyclic phosphazene has the general formula

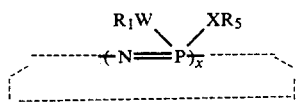

wherein x is 3 or 4.

17 Claims, No Drawings

CYCLIC PHOSPHAZENE AND SALT ANTISTATIC COMPOSITION

This is a divisional of application Ser. No. 305,591, filed Feb. 3, 1989 U.S. Pat. No. 4,971,897.

FIELD OF THE INVENTION

This invention relates to antistatic compositions and elements containing them, including photographic elements. Specifically, this invention relates to antistatic compositions comprising a cyclic phosphazene, a binder, and a salt, and to elements having antistatic layers comprising such antistatic compositions.

BACKGROUND OF THE INVENTION

Static electricity buildup is common on electrically insulating articles, such as paper-rollers and apparatus, flooring materials, various synthetic resin articles, and on elements having an electrically insulating support. This static electricity buildup can cause various problems. These include jamming of paper in paper-feeding apparatus, dust accumulation, unpleasant electric shocks, or noise in electronic circuits.

In photographic elements, radiation-sensitive emulsions are usually coated on an insulating support, rendering the element susceptible to the buildup of static electric charge. This can cause a number of problems. Among the most serious of these is that the discharge of accumulated static charges exposes the radiation-sensitive layer of the element to light, causing marks on the element when developed.

In order to reduce the accumulation of static charge on elements with electrically insulating articles, the article is often coated with a layer containing an antistatic composition that increases electrical conductivity. Alternatively, the antistatic composition can be incorporated into the composition of the article or an existing layer of an element. Various materials have been used as antistatic compositions, such as polymers, surface active agents, salts, and combinations thereof.

A number of such antistatic compositions exhibit problems, especially when used in photographic elements. For example, they can cause fog or loss of photographic sensitivity. The object of the present invention is to provide antistatic compositions that effectively reduce the accumulation of static charge while exhibiting reduced susceptibility to disadvantages such as those described above.

SUMMARY OF THE INVENTION

The present invention provides a composition comprising a cyclic phosphazene of the formula

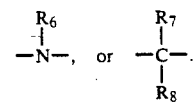    I

In the above formula, x is 3 or 4. In forming an antistatic coating, a binder and a salt that complexes with the cyclic phosphazene may be combined with the cyclic phosphazene I.

$R_1$ and $R_5$ each independently represent the formula $-(R_2-O)_n-R_3$ where n is 0 to 50 and n is 2 or more in at least half of the total substituents. $R_3$ is alkyl, alkenyl, alkynyl, haloalkyl, haloalkenyl, haloalkynyl, phenyl, substituted aromatic, amine, or thio of from 0 to 18 carbon atoms. In the repeating unit $-(R_2-O)-$, $R_2$ is randomly alkyl, having from 2 to 4 carbon atoms in the straight chain between oxygen atoms. W and X each independently represents $-O-$, $-S-$,

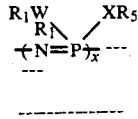

$R_6$, $R_7$, and $R_8$ each independently represents H, alkyl, alkenyl, alkynyl, haloalkyl, haloalkenyl, haloalkynyl, phenyl, substituted aromatic, amine, or thio of from 1 to 18 carbon atoms.

The antistatic composition of the invention effectively imparts antistatic properties to elements having insulating supports.

DETAILED DESCRIPTION OF THE INVENTION

In the phosphazene compounds that are useful in Formula I above:

x represents an integer of 3 or 4.

$R_1$ and $R_5$ are independently represented by the formula $-(R_2-O)_n-R_3$. Useful compounds according to the invention are those where n is from 0 to 50, and n must be 2 or more in at least half of the total substituents. Especially preferred values for n are from 2 to 18.

Each $R_2$ is independently randomly alkyl of from 2 to 4 carbon atoms and preferably 2 to 3 carbon atoms, having from 2 to 4 carbon atoms and preferably 2 carbon atoms in the straight chain between oxygen atoms. By "randomly alkyl of from 2 to 4 carbon atoms," it is meant that the $R_2$ in each of the repeating units $-(R_2-O)-$ may be different from other $R_2$'s, as long as each of the $R_2$'s falls within the overall limitation of being between 2 to 4 carbon atoms, having from 2 to 4 carbon atoms in the straight chain between oxygen atoms. For example, where n=3 and $R_3$ is ethyl, $R_1$ could be $-CH_2CH_2-O-CHCH_3CHCH_3-O-CH_2CHCH_3-O-C_2H_5$. Examples of $R_2$ include ethylene, n-propylene, isopropylene, and n-butylene.

$R_3$ represents alkyl, alkenyl, alkynyl, haloalkyl, haloalkenyl, haloalkynyl, phenyl, substituted aromatic, amine, and thio typically of from 1 to 18 carbon atoms. Preferably, $R_3$ is alkyl, alkenyl, haloalkyl, or aromatic of from 1 to 8 carbon atoms. Suitable as $R_3$ groups include substituted alkyl, alkenyl, or aromatic groups of from 1 to 18 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate. A preferred substituted $R_3$ is a terminally halogen substituted alkyl group, such as a perfluoroalkyl. Examples of $R_3$ include $-CH_3$, $-CH_2CH_3$, $-CH_2CF_3$, $-CH_2CCl_3$, $-(CH_2)_5CH_3$, $-(CH_2)_4-CH=CH-CH_3$, $-CH_2-O-CH_3$, and $(C_6H_4)-(C_8H_{17})$.

$R_6$, $R_7$, and $R_8$ each independently represents hydrogen, alkyl, alkenyl, alkynyl, haloalkyl, haloalkenyl, haloalkynyl, phenyl, substituted aromatic, amine, and thio typically of from 1 to 18 carbon atoms. Preferably, they are H or alkyl, or alkenyl of from 1 to 8 carbon atoms. Also useful are substituted alkyl or alkenyl groups of from 1 to 18 carbon atoms. Examples of substituents include halogen such as F or Cl, amino groups such as $NH_2$, $NHCH_3$, or $N(CH_3)_2$, and thio-containing groups, such as alkylthio (e.g., methylthio, ethylthio) or sulfonate.

The molecular weight of the cyclic compounds of the invention is preferably between 500 and $1.0 \times 10^4$, and more preferably between 500 and 7500 as generally obtained by mass spectrometry or by membrane osometry.

The salts that are useful in the present invention are those that complex with the cyclic phosphazenes of the invention. Any salt that complexes with the cyclic phosphazene is useful. Whether a salt complexes with the cyclic phosphazene can be easily determined by methods known in the art, such as by electrical conductivity measurements, differential thermal analysis (measuring changes in glass transition temperature), vibrational spectroscopy, and nuclear magnetic resonance, or a combination thereof A number of factors can be utilized to determine whether the salt will be likely to complex with the cyclic phosphazene. Generally, the higher the concentration of polar groups in the cyclic phosphazene, the more receptive it is to complexing with all salts. Salts with a low lattice energy tend to complex with the cyclic phosphazene to a greater extent than salts with a high lattice energy. Salts with bulky anions tend to complex with the cyclic phosphazene to a greater extent than salts with smaller anions. Also, salts with lower valence charges (e.g., mono and divalent salts) tend to complex with the phosphazenes to a greater extent than salts with greater valence charges (e.g., trivalent salts).

Examples of salts useful in antistats according to the invention include $KCF_3SO_3$, $Ca(CF_3SO_3)_2$, $Zn(BF_4)_2$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $LiI$, $NaI$, $KI$, $C_4F_9SO_3K$, $KPF_6$, $NaB(C_6H_5)_4$, $LiCF_3SO_3$, $LiClO_4$, $KSCN$, $LiSCN$, and $NaSCN$. One skilled in the art could easily choose additional salts according to the invention, given the salts exemplified above, the factors leading to a likelihood of the salt complexing with the cyclic phosphazene, and the above-described tests to determine whether the salt complexes with the cyclic phosphazene.

The binder of the invention can be any of a number of known binders useful in photographic elements. Binders of the invention include naturally occurring materials, such as proteins, protein derivatives, cellulose derivatives such as cellulose esters, gelatin such as alkali-treated gelatin or acid-treated gelatin, gelatin derivatives such as acetylated gelatin and phthalated gelatin, polysaccharides such as dextran, gum arabic, zein, casein, pectin, collagen derivatives, collodion, agar-agar, arrowroot, albumin, and the like. All these materials are well-known in the art.

Other binders include colloidal albumin or casein, cellulose compounds such as carboxymethyl cellulose, hydroxyethyl cellulose, etc., and synthetic hydrophilic colloids such as polyvinyl alcohol, poly-N-vinylpyrrolidone, polyacrylic acid copolymers, polyacrylamide or its derivatives or partially hydrolyzed products thereof, and solvent and aqueous applied hydrophobic polymers such as poly(methyl methacrylate) and acrylic latexes. Two or more of these binders may be combined. A preferred binder is gelatin, including lime-treated gelatin, acid-treated gelatin, and enzyme-treated gelatin.

The cyclic phosphazenes of the invention are generally present in the composition of the invention in an amount of from 1 to 50 weight percent on a dry weight basis and preferably from 5 to 30 weight percent. The salt is generally present in the composition of the invention in an amount of from 1 to 20 weight percent on a dry weight basis and preferably from 2 to 10 weight percent. The binder is generally present in the composition of the invention in an amount of from 30 to 98% on a dry weight basis and preferably from 60 to 93 weight percent. The phosphazene of formula (I) of the invention when used in a photographic element may be present in an amount of from about 1 to 500 $mg/m^2$ and preferably from about 5 to 300 $mg/m^2$. The salt can be present in the photographic element of the invention in an amount of from about 0.5 to 300 $mg/m^2$ and preferably from about 2 to 150 $mg/m^2$.

The compositions of the invention can be applied to a wide variety of supports to form a wide variety of useful elements with antistatic properties. The support can be, for example, polymeric materials such as poly(ethylene terephthalate), cellulose acetate, polystyrene, poly(methyl methacrylate), and the like. Other supports include glass, paper such as resin-coated paper, metals, fibers including synthetic fibers. Planar supports, such as polymeric films useful in photographic elements, are particularly useful. In addition, the composition of the invention can be coated onto virtually any article where it is desired to decrease resistivity. For example, the compositions can be coated on plastic parts to reduce the unwanted buildup of static electricity. The composition can also be coated on polymeric spheres or other shapes such as those used for electrophotographic toners, and the like.

The composition of the invention can be applied to the support using any of a number of well-known methods. For example, the compositions can be applied by spray coating, fluidized bed coating, dip coating, doctor blade coating, extrusion coating, and other well-known methods of application.

The antistatic composition of the present invention is advantageously used in a photographic element. Any of the known photographic elements can utilize the antistatic composition of the invention. Examples of such photographic elements include color and black and white negative film, color and black and white reversal film, color and black and white paper, x-ray film, film for use in xerographic processes, graphic arts films diffusion transfer elements, and the like.

Photographic elements useful in the present invention generally comprise a number of layers. These layers include radiation sensitive layers such as silver halide layers. Other light-sensitive materials include diazotype compositions, vesicular image-forming compositions, photopolymerizable compositions, electrophotographic compositions including those comprising radiation-sensitive semiconductors, and the like. Sensitizing dyes and color dye-forming couples may be included in the silver halide layers, as described in Research Disclosure, Item 17643, December, 1978. Other materials and layers that can be included in photographic elements useful in the invention include filter dyes, gelatin hardeners, coating aids, and the like, as described in the above-identified Research Disclosure.

Layers containing the antistatic composition of the invention can be in any position of the photographic element. An advantageous position for the antistatic composition to be coated is in a layer directly on the support, which can have a thin subbing layer as is known in the art. Alternatively, the antistatic layer can be on the same side of the support as the radiation-sensitive materials of the photographic element, with protective layers included as interlayers or overcoats, if desired.

In some embodiments of the invention, it may be desirable to coat the layer of the antistatic composition with a protective layer. The protective layer may be desirable for a number of reasons. For example, the protective layer can be an abrasion-resistant layer or a layer that provides other desirable physical properties. In many instances, it may be desirable to protect the antistatic composition from conditions that could cause leaching of one of the components of the composition. Where the support to which the antistatic composition is applied also carries a basic layer, it may be desirable to provide a barrier in the form of a protective layer to prevent contact of the antistatic composition by the base. The protective layer is preferably a film-forming polymer that can be applied using known coating techniques. Examples of such film-forming polymers include cellulose acetate, cellulose acetate butyrate, poly(methyl methacrylate), polyesters, polycarbonates, and the like.

The practice of the invention is further illustrated by the following examples.

Typical cyclic phosphazenes utilized in the invention are as follows:

Compound
A-Hexakis(methoxyethoxyethoxy)cyclotriphosphazene

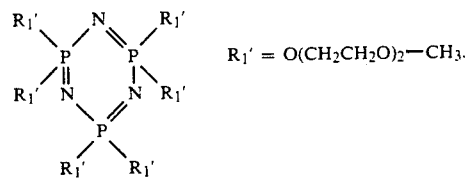

$R_1' = O(CH_2CH_2O)_2\text{—}CH_3$.

An alkoxide solution was prepared by the addition of 2-(2-methoxyethoxy)ethanol (200 mL, 1.7 mol) to a mixture of sodium spheres (23.1 g, 1 mol) in THF (500 mL). A red color was observed. Tetrabutylammonium bromide (0.25 g) was added to the alkoxide solution followed by the dropwise addition of a solution of hexachlorocyclotriphosphazene (50 g, 0.143 mol) in THF (500 mL). A white precipitate (NaCl) formed. The reaction mixture was refluxed for 3 hours and then stirred at room temperature overnight. The precipitate was allowed to settle, the reaction solution decanted and the excess alkoxide in the supernatant neutralized with 5% hydrochloric acid. Following neutralization, THF and water were removed on the rotary evaporator followed by vacuum distillation to remove excess alcohol. Finally the product was isolated as a viscous red oil after filtration through a glass frit to remove any remaining salt. The yield was 95%. Product analysis was carried out with IR, NMR, GC, HPLC, and mass spec. A $^{31}P$ NMR spectrum showed a singlet at 20 PPM. IR (P=N), 1240 cm$^{-1}$.

Compound B

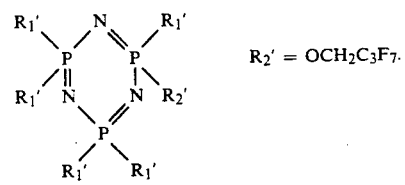

$R_2' = OCH_2C_3F_7$.

Two separate alkoxide solutions were prepared. Sodium heptafluorobutoxide was prepared by the addition of heptafluorobutanol (31 mL, 0.25 mol) to a stirred mixture of sodium spheres (3.3 g, 0.14 mol) in THF. The etheric alkoxide was prepared by the addition of 2-(2-methoxyethoxy)ethanol (330 mL, 2.83 mol) to a stirred solution of sodium spheres (19.8 g, 0.84 mol). The fluoroalkoxide solution was added dropwise to a stirred solution of hexachlorocyclotriphosphazene (49.4 g, 0.14 mol) in THF (300 mL). Tetrabutylammonium bromide was added to the reaction mixture (0.26 g) followed by the dropwise addition of etheric alkoxide solution. The reaction mixture was stirred for 72 hours at 25° C. followed by stirring at reflux for 8 hours. The reaction was allowed to cool overnight and then was neutralized and the product isolated as described above.

Compound C

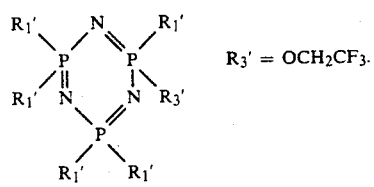

$R_3' = OCH_2CF_3$.

Two separate alkoxides solutions were prepared. The fluoroalkoxide was prepared by the addition of trifluoroethanol (15 mL, 0.19 mol) to a stirred mixture of sodium spheres (3.4 g, 0.15 mol) in THF. Th etheric alkoxide was prepared by the addition of 2-(2-methoxyethoxy)ethanol (150 mL, 1.28 mol) to a stirred mixture of sodium spheres (20.0 g, 0.87 mol) in THF. The fluoroalkoxide solution was added dropwise to a solution of hexachlorocyclotriphosphazene (50.4 g, 0.14 mol) in THF (500 mL) that had been cooled with an ice bath. The reaction mixture was allowed to warm to room temperature, tetrabutylammonium bromide (0.25 g) was added to the solution, followed by the dropwise addition of the etheric alkoxide solution. The reaction mixture was stirred overnight, refluxed for 8 hours, stirred again overnight, neutralized and isolated as described for Compound A.

Compound D

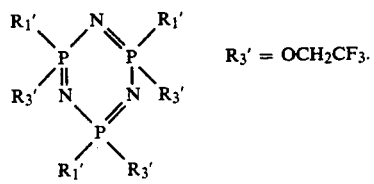

$R_3' = OCH_2CF_3$.

Two separate alkoxides were prepared. The fluoroalkoxide was prepared by the addition of trifluoroethanol (33 mL, 0.19 mol) to a stirred mixture of sodium spheres (9.9 g, 0.43 mol) in THF. The etheric alkoxide was prepared by the addition of 2-(2-methoxyethoxyethanol) (200 mL, 1.7 mol) to a stirred mixture of sodium spheres (13.3 g, 0.57 mol) in THF. The fluoroalkoxide solution was added dropwise to a stirred solution of hexachlorocyclotriphosphazene (50.0 g, 0.14 mol) in THF (300 mL), followed by the addition of the etheric alkoxide solution. Tetrabutylammonium bromide (0.25 g) was added, the reaction mixture stirred overnight followed by heating at reflux for 8 hours and finally stirring at 25° C. for one week. The reaction mixture was neutralized and the product isolated as described for Compound A.

Compound E

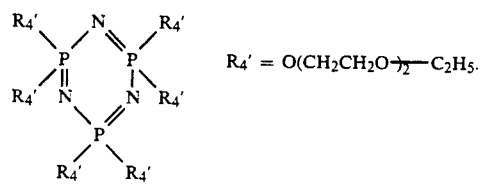

$R_4' = O(CH_2CH_2O)_2$—$C_2H_5$.

The alkoxide solution was prepared by the addition of 2-(2-ethoxyethoxy)ethanol (33 g, 0.25 mol) to a mixture of sodium spheres (4.0 g, 0.17 mol) in THF to yield a red, clear solution. A solution of hexachlorocyclotriphosphazene (5.0 g, 0.014 mol) in THF (150 mL) was added dropwise to the stirred alkoxide solution followed by the addition of tetrabutylammonium bromide. The reaction mixture was stirred at 25° C. overnight, stirred at reflux for 8 hours, and stirred again at 25° C. for one week. The reaction mixture was neutralized and the product isolated (as an oil) as described for Compound A.

Compound
F-Octakis(methoxyethoxyethoxy)cyclotetraphosphazene

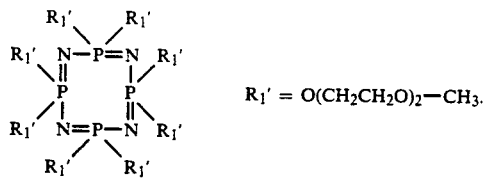

$R_1' = O(CH_2CH_2O)_2$—$CH_3$.

An alkoxide solution was prepared by the addition of 2-(2-methoxyethoxy)ethanol (213 mL, 1.81 mol) to a mixture of sodium spheres (22.7 g, 0.99 mol) in THF. Tetrabutylammonium bromide (0.27 g) was added to the alkoxide solution followed by the dropwise addition of a solution of octachlorocyclotetraphosphazene (II) (50.7 g, 0.11 mol) in THF. The reaction was stirred at 25° C. for 72 hours, refluxed for 5 hours, stirred at 25° C. for 16 hours. The reaction mixture was neutralized and the product isolated as described for Compound A. A $^{31}$P NMR spectrum showed a singlet at +2 PPM. IR (P=N), 1320 cm$^{-1}$.

Compound G

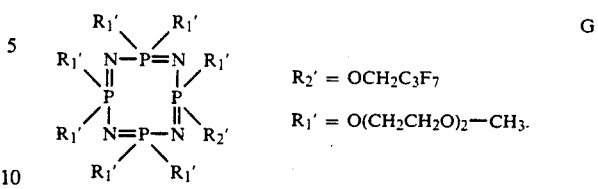

$R_2' = OCH_2C_3F_7$ $R_1' = O(CH_2CH_2O)_2$—$CH_3$.

Two separate alkoxide solutions were prepared. The fluoroalkoxide was prepared by the addition of heptafluorobutanol (30 mL, 0.24 mol) to a stirred mixture of sodium spheres (2.6 g, 0.11 mol) in THF. The etheric alkoxide was prepared by the addition of 2-(2-methoxyethoxy)ethanol (210 mL, 1.8 mol) to a stirred solution of sodium spheres (19.9 g, 0.87 mol) in THF. The fluoroalkoxide solution was added dropwise to a stirred solution of octachlorocyclotetraphosphazene (50.2 g, 0.11 mol) in THF, the reaction mixture was stirred overnight at 25° C., tetrabutylammonium bromide (0.29 g) added, followed by the addition of the etheric alkoxide. The reaction mixture was stirred overnight at room temperature, stirred at reflux for 8 hours, and stirred at 25° C. for 48 hours. The reaction mixture was neutralized and the products isolated as described for Compound A.

Compound H

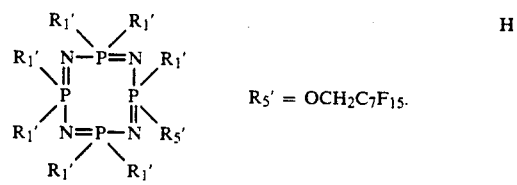

$R_5' = OCH_2C_7F_{15}$.

Three separate alkoxide solutions were prepared. The fluoroalkoxide was prepared by the addition of perfluorooctanol (45.6 g, 0.11 mol) in THF (200 mL) to a stirred mixture of sodium (2.5 g, 0.11 mol) in THF (50 mL). An etheric alkoxide solution was prepared by the addition of 2-(2-methoxyethoxy)ethanol (130 mL, 1.11 mol) to a stirred mixture of sodium spheres (17.75 g, 0.77 mol) in THF. A third alkoxide solution was prepared by the addition of 2-(2-methoxyethoxy)ethanol (30 mL, 0.26 mol) to a stirred mixture of sodium spheres (2.48 g, 0.22 mol) in THF. The larger etheric alkoxide was added dropwise to a stirred solution of octachlorocyclotetraphosphazene (50.05 g, 0.11 mol) and tetrabutylammonium bromide (0.31 g) in THF (1 liter). The reaction mixture was heated at reflux for 16 hours, the reaction was allowed to cool, the fluoroalkoxide was added to the stirred reaction mixture over a three-hour period, and the reaction was stirred at 25° C. for 72 hours. The smaller quantity of etheric alkoxide was then added to the reaction mixture and the mixture was stirred for 72 hours, half of the time at reflux temperature, the other at 25° C. The reaction mixture was not neutralized because the pH of the mixture was 6. The mixture was isolated as described for Compound A, and in addition a solution of the product in methanol was exposed to cation exchange resin.

Compound I

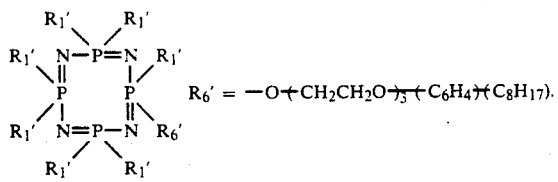

$R_6' = -O(CH_2CH_2O)_3(C_6H_4)(C_8H_{17})$.

Two separate alkoxide solutions were prepared. The first was prepared using an octylphenoxytriethoxyethanol (TRITON X-35 ®Rohm & Haas) as the starting alcohol. The first starting alcohol (60.62 g, 0.179 moles) was dissolved in 150 ml THF and the solution dried over CaH₂ for several days. The dry solution was then filtered and added dropwise to a dispersion of NaH, (4.43 g, 0.185 moles) in 150 ml dry THF.

The second alkoxide solution was prepared using 2-(2-methoxyethoxy)ethanol. 190.28 g (1.58 moles) of this alcohol were added dropwise to a slurry of 32.68 g (1.36 moles) NaH in 500 ml of dry THF.

For both alkoxides, after addition is complete, the reaction is allowed to continue with stirring about 18 hours (overnight).

The mixed substitutent tetramer is prepared in a two-step addition. First, the sodium alkoxide prepared from the octylphenoxytriethoxyethanol is filtered and added dropwise to 75.46 g (0.163 moles) of octachlorocyclotetraphosphazene in 600 ml of dry THF. When the addition is complete, the reaction mixture is stirred at reflux for one hour, then allowed to cool to room temperature for 18 hours. The filtered etheric sodium alkoxide is then added dropwise to the reaction mixture, refluxed for one hour, and finally cooled overnight. The cooled crude product is neutralized using 1% HCl and filtered to remove NaCl, then stirred with activated carbon. The carbon is removed by filtration and the solvents and residual 2-(2-methoxyethoxy)ethanol by vacuum distillation. The product is then washed in a separatory funnel with 100 ml of 10% THF in hexane to remove residual octylphenoxytriethoxyethanol, and finally stripped again to remove residual solvents to yield 190 g (87%) of product.

Compound J

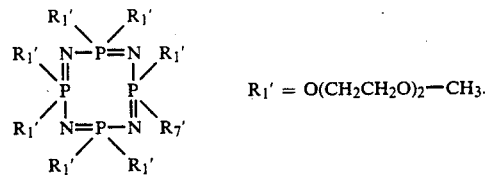

$R_1' = O(CH_2CH_2O)_2-CH_3$.

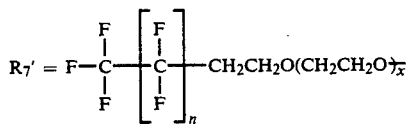

$\bar{n} = 8 \quad \bar{x} = 9.9 \quad \overline{mw.} = 950$

Two separate alkoxide solutions were prepared. The first was prepared using a perfluoroalkylpolyethoxyethanol (Zonyl FSN ®Dupont) as the starting alcohol. The perfluoroalkylpolyethoxyethanol was obtained by freeze-drying from a solution in isopropanol and water. The waxy perfluoroalkylpolyethoxyethanol was then dissolved in THF to give a cloudy solution, about 45% solids. The soluble fraction was decanted and further dried over CaH₂. 145 g. of dry 44% solids solution containing 63.3 g (0.08 moles) of perfluoroalkylpolyethoxyethanol were filtered and added dropwise to a dispersion of NaH, (4.6 g, 0.192 moles), in dry THF. The addition was performed slowly to control the foaming that occurred as a result of H₂ generation.

The second alkoxide solution was prepared using 2-(2-methoxyethoxy)ethanol. 81.5 g (0.68 moles) of this alcohol were added dropwise to a slurry of 15.24 g (0.635 moles) NaH in 350 ml of dry THF.

For both alkoxides, after addition is complete, the reaction is allowed to continue with stirring about 18 hours (overnight).

The mixed substituent tetramer is prepared in a two-step addition. First, the sodium alkoxide prepared from the perfluoroalkylpolyethoxyethanol is decanted and added dropwise to 30 g (0.065 moles) of octachlorocyclotetraphosphazene in 300 ml of dry THF. When the addition is complete, the reaction mixture is stirred at reflux for one hour, then allowed to cool to room temperature for 18 hours. The filtered etheric sodium alkoxide is then added dropwise to the reaction mixture, refluxed for one hour, and finally cooled overnight. The cooled crude produce is neutralized using 1% HCl and filtered to remove NaCl, then stirred with activated carbon. The carbon was removed by filtration, and the final product was isolated as described for compound A.

Compound K

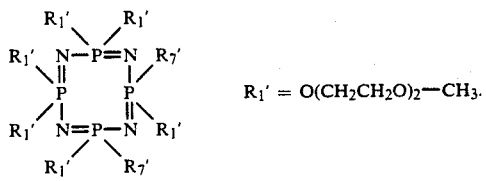

$R_1' = O(CH_2CH_2O)_2-CH_3$.

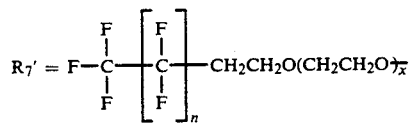

$\bar{n} = 8 \quad \bar{x} = 9.9 \quad \overline{mw.} = 950$

Two separate alkoxide solutions were prepared. The first was prepared using a perfluoroalkylpolyethoxyethanol (Zonyl FSN ®Dupont) as the starting alcohol. The perfluoroalkylpolyethoxyethanol was obtained by freeze-drying from a solution in isopropanol and water. The waxy perfluoroalkylpolyethoxyethanol (117 g. 0.129 moles) was then dissolved in 145 ml dry THF and further dried over CaH₂. The dry perfluoro-alkylpolyethoxyethanol solution was recovered by decantation and added dropwise to a dispersion of NaH, (4.66 g, 0.194 moles), in dry THF. The addition was performed slowly to control the foaming that occurred as a result of H₂ generation.

The second alkoxide solution was prepared using 2-(2-methoxyethoxy)ethanol. 82 g (0.68 moles) of this alcohol were added dropwise to a slurry of 15.22 g (0.634 moles) NaH in 356 ml of dry THF.

For both alkoxides, after addition is complete, the reaction is allowed to continue with stirring about 18 hours (overnight).

The mixed substituent tetramer is prepared in a two-step addition. First, the sodium alkoxide prepared from the perfluoralkylpolyethoxyethanol is filtered and added dropwise to 30 g (0.065 moles) of octachlorocyclotetraphosphazene in 130 ml of dry THF. When the addition is complete, the reaction mixture is stirred at reflux for one hour, then allowed to cool to room temperature for 18 hours. The filtered etheric sodium alkoxide is then added dropwise to the reaction mixture, refluxed for one hour, and finally cooled overnight. The cooled crude product is neutralized using 1% HCl and filtered to remove NaCl, then stirred with activated carbon. The carbon is removed by filtration and the final product is isolated as described for compound A.

EXAMPLES 1-51

The examples below demonstrate the antistatic properties of compositions according to the invention. Also illustrated are control examples where the salt is not utilized in the system and where only binder and salt are used without the phosphazene compounds. The results are set forth in Tables I, II, III, and IV, attached. The surface resistivity was measured with a Keithly picoammeter according to the procedure of ASTM standard D257 at 70° F. and 20% and 50% relative humidity. The examples illustrate the antistatic properties of the cyclic phosphazine and salt compositions of the invention when utilized with various binders. Some examples illustrate the advantageous antistatic properties of the invention when utilized in a gelatin-containing layer and, therefore, illustrate the suitability for photographic uses where gelatin serves as the carrying and binder medium for photographically active materials.

TABLE I

Coatings Featuring Type IV Gelatin on Polyethyleneterephthalate Base

| Example | Gelatin mg/m² | Comp'd mg/m² | Salt mg/m² | Surface Resistivity Log. 50% RH | ohm/sq. 20% RH |
|---|---|---|---|---|---|
| | | | CF₃SO₃Li | | |
| 1 (Control) | 1075 | none | none | 14.1 | >15.0 |
| 2 (Control) | 1183 | none | 118 | 13.8 | 14.7 |
| Compound A: | | | | | |
| 3 (Control) | 1161 | 129 | none | 13.4 | 14.3 |
| 4 | 774 | 387 | 129 | 9.2 | 10.3 |
| 5 | 774 | 430 | 86 | 9.6 | 10.5 |
| 6 | 892 | 301 | 100 | 9.7 | 10.7 |
| 7 | 430 | 183 | 43 | 9.6 | 10.7 |
| 8 | 172 | 68 | 17 | 10.3 | 11.5 |
| Compound F: | | | | | |
| 9 | 892 | 301 | 100 | 9.7 | 10.6 |
| 10 | 451 | 150 | 49 | 9.7 | 10.7 |
| | | | CF₃SO₃K | | |
| 11 | 967 | 215 | 107 | 9.2 | 9.6 |
| 12 | 484 | 107 | 54 | 9.4 | 9.9 |
| 13 | 451 | 150 | 49 | 9.4 | 9.8 |
| 14 | 301 | 100 | 33 | 9.3 | 9.7 |
| Compound G: | | | | | |
| 15 | 494 | 99 | 49 | 10.0 | 10.7 |
| 16 | 1075 | 107 | 107 | 10.1 | 10.8 |
| Compound H: | | | | | |
| 17 | 494 | 99 | 49 | 10.4 | 11.0 |
| Compound J: | | | | | |
| 18 | 1075 | 54 | 54 | 10 | 10.8 |

TABLE II

Coatings of Poly(vinyl alcohol) Binder on Polyethylterephthalate Base

| Example | Binder mg/m² | Comp'd mg/m² | LiBF₄ mg/m² | Surface Resistivity Log, 50% RH | ohm/sq. 20% RH |
|---|---|---|---|---|---|
| 20 (Control) | 1290 | none | none | 14.2 | >15.0 |
| 21 (Control) | 1161 | none | 129 | 11.3 | 14.6 |
| Compound A: | | | | | |
| 22 (Control) | 1161 | 129 | none | 11.6 | 12.9 |
| 23 | 1053 | 118 | 118 | 8.8 | 9.9 |
| 24 | 1107 | 123 | 61 | 9.1 | 10.0 |
| 25 | 1183 | 54 | 54 | 9.8 | 10.7 |
| Compound B: | | | | | |
| 26 | 967 | 215 | 107 | 9.1 | 10.6 |
| 27 | 1053 | 118 | 118 | 9.6 | 11.2 |
| 28 | 1107 | 61 | 123 | 9.6 | 11.5 |
| Compound C: | | | | | |
| 29 | 967 | 215 | 107 | 9.3 | 11.4 |
| 30 | 1053 | 118 | 118 | 9.5 | 11.7 |
| Compound D: | | | | | |
| 31 | 967 | 215 | 107 | 9.9 | 10.8 |
| Compound E: | | | | | |
| 32 | 1075 | 107 | 107 | 9.7 | 10.7 |
| 33 | 537 | 54 | 54 | 9.4 | 11.2 |
| Compound F: | | | | | |
| 34 | 1075 | 107 | 107(CF₃SO₃Li) | 9.7 | 11.1 |
| 35 | 1075 | 107 | 107(CF₃SO₃K) | 9.4 | 10.1 |
| 36 | 1075 | 107 | 107[Ca(CF₃SO₃)₂] | 9.6 | 10.2 |
| 37 | 1075 | 107 | 107[Zn(BF₄)₂] | 9.4 | 9.9 |
| 38 | 1075 | 107 | 107(LiBF₄) | 9.4 | 10.0 |
| Compound G: | | | CF₃SO₃K | | |
| 39 | 494 | 98 | 49 | 10.0 | 10.8 |
| 40 | 989 | 193 | 98 | 9.9 | 10.6 |
| Compound H: | | | | | |
| 41 | 494 | 98 | 49 | 9.8 | 11.2 |

TABLE III

Coatings Featuring Acrylic Latex* Binder on Polyetheneterephthate Base

| Example | Binder mg/m² | Comp'd mg/m² | CF₃SO₃Li mg/m² | Surface Resistivity Log, 50% RH | ohm/sq. 20% RH |
|---|---|---|---|---|---|
| 42 (Control) | 1075 | none | none | >15.0 | >15.0 |
| Compound A: | | | | | |
| 43 (Control) | 1075 | 107 | none | 14.0 | 14.7 |
| 44 | 1075 | none | 107 | 10.1 | 12.4 |
| 45 | 1075 | 107 | 107 | 9.3 | 11.0 |
| 46 | 989 | 197 | 98 | 8.8 | 10.3 |
| 47 | 537 | 54 | 54 | 9.4 | 11.3 |
| Compound F: | | | | | |
| 48 | 1075 | 107 | 107 | 9.1 | 10.9 |
| Compound J: | | | | | |
| 49 | 1075 | 107 | 107 | 9.2 | 10.8 |
| Compound K: | | | | | |
| 51 | 1075 | 107 | 107 | 9.4 | 11.0 |

*An 80/20 mixture of Rhoplex ™ B88 and Rhoplex ® B60A acrylic latexes manufactured by Rohm and Haas

TABLE IV

Coatings Featuring Poly(methyl methacrylate) Binder* on Cellulose Acetate Base

| Example | Binder mg/m² | Comp'd mg/m² | CF₃SO₃M mg/m² | Surface Resistivity Log, 50% RH | ohm/sq. 20% RH |
|---|---|---|---|---|---|
| 52 (Control) | 967 | none | none | >15.0 | >15.0 |
| 53 (Control) | 967 | none | 10(Li) | >15.0 | >15.0 |

TABLE IV-continued

Coatings Featuring Poly(methyl methacrylate) Binder* on Cellulose Acetate Base

| Example | Binder mg/m² | Comp'd mg/m² | CF₃SO₃M mg/m² | Surface Resistivity Log, 50% RH | ohm/sq. 20% RH |
|---|---|---|---|---|---|
| Compound E: | | | | | |
| 54 | 967 | 107 | 10(Li) | 11.6 | 12.2 |
| Compound J: | | | | | |
| 55 | 494 | 97 | 4.6(K) | 12.0 | 12.4 |
| 56 | 989 | 193 | 9.2(Li) | 11.5 | 12.2 |
| Compound K: | | | | | |
| 59 | 989 | 193 | 9.2(K) | 11.6 | 12.1 |
| 60 | 494 | 98 | 4.6(K) | 11.8 | 12.2 |

*Elvacite 2010 - Mfg. by DuPont

This invention has been described in detail with particular reference to preferred embodiments thereof, but let it be understood that variations and modifications can be affected within the spirit and scope of the invention. For instance, while described as photographic components the antistatic layers of the invention also could be utilized for operating room or computer room areas where antistatic properties are desirable. The components of the invention could also be applied to sheets for use in copiers for electrophotographic images.

We claim:

1. An antistatic composition comprising a binder, 1 to 50 weight percent on a dry weight basis of a cyclic phosphazene, and 1 to 20 weight percent on a dry weight basis of a salt that complexes with the cyclic phosphazene to produce an antistatic composition, wherein said cyclic phosphazene has the general formula

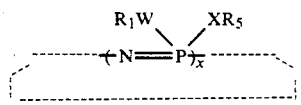

wherein
the x is 3 or 4,
$R_1$ and $R_5$ each independently represents the formula $-(R_2-O)_n-R_3$ wherein n is 0 to 50, and n is 2 or more for at least half of the total substituents, $R_2$ is randomly alkyl of from 2 to 4 carbon atoms, having from 2 to 4 carbon atoms in the straight chain between oxygen atoms, and $R_3$ is alkyl, alkenyl, alkynyl, haloalkyl, haloalkenyl, haloalkynyl, phenyl, substituted aromatic, amine, or thio of from 1 to 18 carbon atoms,
W, and X, each independently represents

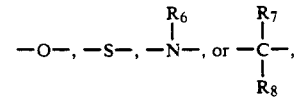

wherein $R_6$, $R_7$, and $R_8$ each independently represents H, alkyl, alkenyl, alkynyl, haloalkyl, haloalkenyl, haloalkynyl, phenyl, substituted aromatic, amine, or thio of from 1 to 18 carbon atoms.

2. An antistatic composition according to claim 1 wherein $R_2$ has 2 carbon atoms in the straight chain between oxygen atoms and n is from 2 to 10.

3. An antistatic composition according to claim 2 wherein W and X each independently represent $-O-$.

4. An antistatic composition according to claim 3 wherein $R_2$ and $R_3$ are each independently methyl, ethyl, or perfluoroethyl.

5. An antistatic composition according to claim 1 wherein the salt is selected from the group consisting of $KCF_3SO_3$, $Ca(CF_3SO_3)_2$, $Zn(BF_4)_2$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, LiI, NaI, KI, $C_4F_9SO_3K$, $KPF_6$, $NaB(C_6H_5)_4$, $LiCF_3SO_3$, $LiClO_4$, KSCN, LiSCN, and NaSCN.

6. The method of claim 1 wherein $R_3$ is substituted or unsubstituted alkyl, alkenyl, alkynyl, haloalkyl, haloalkenyl, haloalkynyl, phenyl, substituted aromatic, amine, or thio of from 1 to 18 carbon atoms.

7. The method of claim 6 wherein $R_3$ represents a halogen substituted alkyl or phenyl group.

8. An antistatic composition according to claim 1 wherein said cyclic phosphazene is hexakis(methoxyethoxy)cyclotriphosphazene.

9. An antistatic composition according to claim 6 wherein the salt is selected from the group consisting of $KCF_3SO_3$, $LiBF_4$, $NaBF_4$, $NaCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, LiI, NaI, KI, $C_4F_9SO_3K$, and $KPF_6$.

10. An antistatic composition according to claim 1 wherein the binder is a hydrophilic colloid.

11. An antistatic composition according to claim 1 wherein the binder is gelatin.

12. An antistatic composition according to claim 1 wherein said cyclic phosphazene comprises octakis(-metoxyethoxyethoxy)cyclotetraphosphazene.

13. The composition of claim 1 wherein said cyclic phosphazene is present in an amount of from 5 to 30 weight percent.

14. The composition of claim 1 wherein said salt is present in an amount of 2 to 10 weight percent.

15. The composition of claim 1 wherein said binder is present in an amount of from 30 to 98 percent on a dry weight basis.

16. The composition of claim 13 wherein said salt is present in an amount of 2 to 10 weight percent.

17. The composition of claim 16 wherein said binder is present in an amount of from 30 to 98 percent on a dry weight basis.

* * * * *